United States Patent
Knoer et al.

(10) Patent No.: US 6,739,072 B2
(45) Date of Patent: May 25, 2004

(54) METHOD FOR DRYING PASTE-LIKE MATERIALS

(75) Inventors: Peter Knoer, Kreuzlingen (CH); Thomas Braun, Stockach (DE)

(73) Assignee: Innoplana Umwelltechnik AG, Taegerwilen (CH)

(*) Notice: Subject to any disclaimer, the term of this patent is extended or adjusted under 35 U.S.C. 154(b) by 0 days.

(21) Appl. No.: 10/070,745

(22) PCT Filed: Jul. 30, 2001

(86) PCT No.: PCT/IB01/01387
§ 371 (c)(1),
(2), (4) Date: Apr. 1, 2002

(87) PCT Pub. No.: WO02/12811
PCT Pub. Date: Feb. 14, 2002

(65) Prior Publication Data
US 2002/0152631 A1 Oct. 24, 2002

(30) Foreign Application Priority Data
Aug. 9, 2000 (DE) .......................................... 100 38 910

(51) Int. Cl.$^7$ .................................................. F26B 19/00
(52) U.S. Cl. ........................................... 34/216; 34/203
(58) Field of Search .......................... 34/216, 203, 208, 34/205, 219, 224; 241/23, 65, 103

(56) References Cited

U.S. PATENT DOCUMENTS

| | | | | |
|---|---|---|---|---|
| 4,193,206 A | * | 3/1980 | Maffet ............................ | 34/12 |
| 5,230,809 A | * | 7/1993 | Roslonski .................... | 210/748 |
| 5,269,474 A | * | 12/1993 | Reis et al. ............... | 241/101.2 |
| 5,609,820 A | * | 3/1997 | Bridges et al. ................ | 422/23 |
| 5,759,224 A | * | 6/1998 | Olivier ............................ | 71/9 |

* cited by examiner

Primary Examiner—Henry Bennett
Assistant Examiner—Camtu Nguyen
(74) Attorney, Agent, or Firm—Ladas & Parry

(57) ABSTRACT

On drying pasty materials, particularly sewage sludge, the material is compacted in an intermediate drying stage with a dry fraction of 60 to 80%, so that relatively low energy costs are required. The conveying of the material takes place both during pre-drying and after leaving the compactor on one or two air-permeable conveyor belts (3, 4) succeeding one another in the conveying direction and which are enclosed in a common housing (2). Thus, drying before and after compacting is performed under identical method conditions, so that it is possible to produce a simple and therefore inexpensive installation for performing the method. The finished product has advantageous characteristics with regards to density and abrasion resistance, so that dust production is avoided during subsequent handling.

17 Claims, 1 Drawing Sheet

METHOD FOR DRYING PASTE-LIKE MATERIALS

Figure 1:
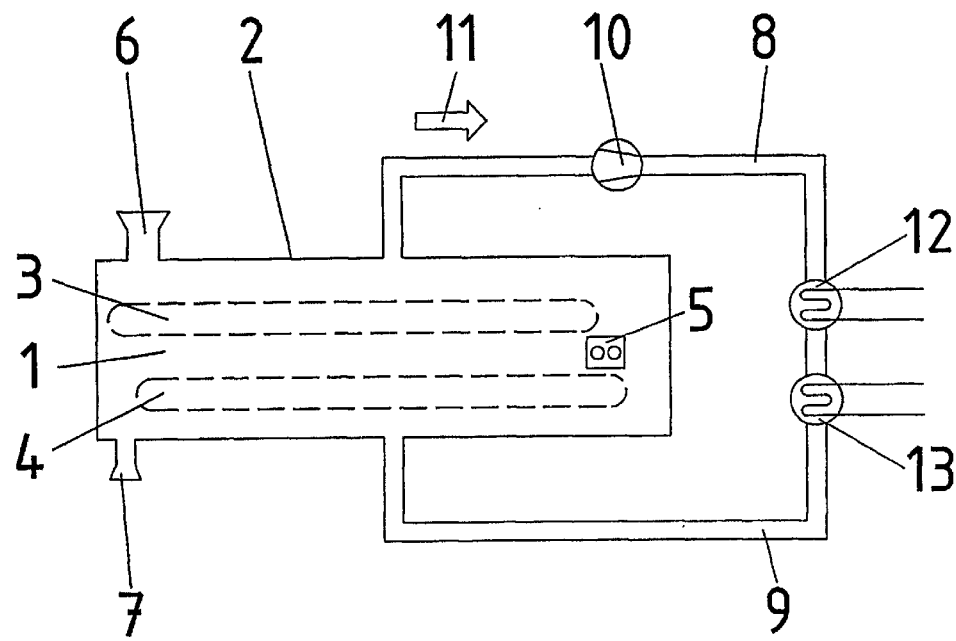

The invention relates to a method for drying pasty materials and the production of a high density granulate by compacting.

The problem arises when drying pasty materials, such as e.g. sewage sludge, of producing a granulate, which has a very uniform granulate size and a good abrasion resistance in order to avoid dust formation.

U.S. Pat. No. 4,193,206 discloses a method of this type, in which the compacting takes place at the end of the drying process with a material dry fraction of more than 85%. As such a material cannot be extruded through nozzles, the addition of a plasticizer is proposed. However, the product compacted in this way has a non-uniform granulate size, so that it is subsequently necessary to separate and return dust and comminute granulate particles which are too large. The aim is to obtain a granulate with a bulk density of more than 480 kg/m3 (30 lb/ft3). An installation for performing this method is correspondingly complicated requiring different apparatuses for the drying method and the extruder and despite the use of plasticizers the extruder has to process a particularly firm, tough material.

EP-B-781741 discloses a method for drying sewage sludge in which a still relatively moist material with a dry fraction of 40 to 60% is extruded on leaving a thin film evaporator, so that as a result of the sudden change in the method conditions a porous product with a hardened surface area is obtained, whose enlarged specific surface is advantageous both for the subsequent, further drying and for the later use thereof as a fertilizer. As a result of the special heat control used, due to a relatively complicated drying in a thin film evaporator, the method has a good thermal efficiency. However, the relatively complicated installation used is disadvantageous, as is the bulk density of the granulate limited to approximately 500 mg/m3.

A method is also known in which drying of sewage sludge only takes place in a belt dryer. However, it suffers from the disadvantage that the product leaving the belt dryer has a very irregular granulate size and a low density, so that it is very crumbly and therefore has a limited abrasion resistance. This leads to correspondingly high capacity requirements during the subsequent handling, e.g. on conveying to silos, on filling into sacks and during transportation, associated with the problem of a significant dust production.

To avoid this disadvantage it is also known to pelletize the dry product after leaving the belt dryer. However, the equipment used for this is mechanically complicated and expensive, subject to high wear and requiring high motive energy.

The problem of the invention is to avoid the indicated disadvantages of the known methods and to find a method which, with relatively limited apparatus expenditure and low operating costs, permits the production of a high-grade granulate, particularly with respect to a high density and strength, such as could hitherto only be achieved in a particularly complicated manner by pelletizing the finally dried product.

In the case of a method of the aforementioned type, the invention solves this problem in that the compacting takes place as a function of the nature of the material with a dry fraction of 60 to 80%, so that the degree of compacting is substantially maintained during subsequent further drying.

In a preferred embodiment, the method of the invention permits the drying of material in a simple manner under constant method conditions both before and after compacting. Identical method conditions before and after compacting lead to a significant simplification of the installation used for the method, in that all the drying, including the compacting, can take place in a common housing of an apparatus, e.g. a belt dryer, without separate systems having to be created with respect to the pressure and temperature. In addition, all the drying can inexpensively take place with a mechanically unitary conveyor system, e.g. on a belt conveyor system with one or more conveyor belts.

Embodiments of the installations used are described in greater detail hereinafter relative to the diagrammatic FIGS. 1 and 2.

The installation according to FIG. 1 has a belt dryer 1, in whose housing 2 are enclosed a conveyor 3, 4 and a compactor 5. The conveyor comprises two superimposed, air-permeable conveyor belts 3, 4 and in the transition area between the two is provided a compactor 5 e.g. constructed as a radial extruder. The latter consequently takes up the material, such as e.g. sewage sludge, predried on the first conveyor belt 3 and delivers it in the compacted state to the second conveyor belt 4, where it undergoes final drying. The inlet 6 in the upper part of the dryer housing 2 for flowable or viscous material and the outlet 7 on the bottom of the dryer housing for the spreadable finished product can be constructed in lock form in order to prevent an escape of the gases of the drying process into the open and/or in order to perform drying under an overpressure.

The gas (air) used for drying purposes is circulated in the direction of the arrow 11 by a blower 10 connected by lines 8, 9 to the belt dryer 1. The moisture absorbed by the gas is separated in the condenser 12. The gas is then reheated in the following heat exchanger 13.

Figure 2:
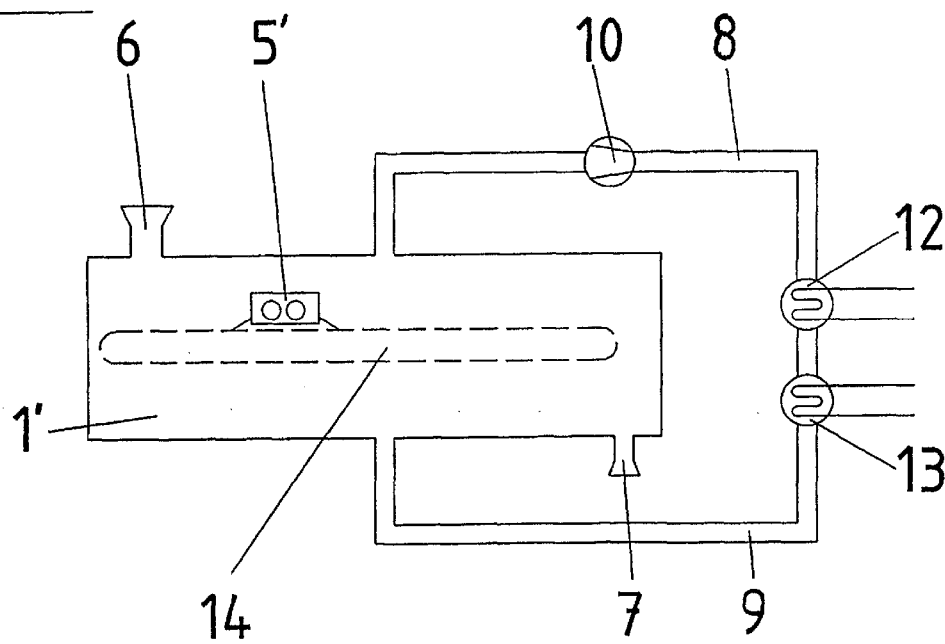

The installation according to FIG. 2 represents a simplified embodiment, in that there is only one conveyor belt 14 in the belt dryer 1'. In order to be able to compact the material here in an intermediate drying stage, the compactor 5' is e.g. provided in a central area of the conveyor system above the conveyor belt 13 and then returns it to the same belt. The compactor opposition is chosen in such a way that the material received by it has been dewatered to such an extent that on compacting a stable material, preferably in granulate form, is formed, in that it maintains its density for further drying.

The degree of drying necessary for compacting is dependent on the nature of the material and must consequently be established in each case. It has surprisingly been found that such a compacting is possible even with a moisture content of 60 to 80%, without any agglomeration of the granulate particles formed and without the intense compacting being lost during subsequent further drying. Thus, compacting takes place in a particularly economic manner with limited force and energy expenditure and the roughly five times higher costs for a pelletizing device can be avoided.

The bulk density of the finished product obtainable with the method according to the invention is approximately 700 kg/m3, without compacting having to take place in the final drying state and accompanied by the addition of a plasticizer.

What is claimed is:

1. Method for drying pasty materials, particularly sewage sludge and thereby production of a high density granulate by compacting, wherein the compacting takes place as a function of the nature of the material with a dry fraction of 60 to 80%, so that the degree of compacting during subsequent further drying is substantially maintained.

2. Method according to claim 1, wherein the material is dried under identical method conditions before and after the compacting.

3. Method according to claim 1, wherein drying takes place in a belt dryer (1) through which flows a gaseous medium, so that the compactor (5) is enclosed in the housing (2) of the belt dryer (1).

4. Method according to claim 3, wherein the compactor (5) is provided in the transition area between two conveyor belts (3, 4) of the belt dryer (1) succeeding one another in the conveying direction.

5. Method according to claim 1, wherein drying takes place on a single conveyor belt (14) of the belt dryer, in that the material is received by the compactor (5') from the conveyor belt (14) and is returned thereto after the compacting.

6. Method according to claim 5, wherein for adapting the method to the nature of the material to be dried the compactor (5') is adjustable in the direction of the conveyor belt (14).

7. Method according to claim 3, wherein drying takes place on a single conveyor belt (14) of the belt dryer, in that the material is received by the compactor (5') from the conveyor belt (14) and is returned thereto after the compacting.

8. Method according to claim 7, wherein for adapting the method to the nature of the material to be dried the compactor (5) is adjustable in the direction of the conveyor belt (14).

9. Apparatus for carrying out the method according to claim 1, wherein a housing (2) provided with an inlet (6) and an outlet (7) encloses a conveyor and a compactor (5,5'), the conveyor has at least one air-permeable conveyor belt (3,4, 14) and the compactor (5,5') is arranged in an area of the conveyor.

10. Apparatus according to claim 9, wherein the housing (2) is part of a circuit, comprising a blower (10), a condenser (12) and a heat exchanger (13), which are connected to each other by lines (8,9).

11. In a method for drying pasty sewage sludge and producing a high density granulate therefrom by compacting, the improvement wherein the compacting provides a dry fraction of 60 to 80% so that a degree of the compacting of the dry fraction is substantially maintained during subsequent further drying of the dry fraction.

12. Method according to claim 1, wherein the dry fraction is not re-wet before the subsequent further drying.

13. Method according to claim 2, wherein drying takes place in a belt dryer (1) through which flows a gaseous medium, so that the compactor (5) is enclosed in the housing (2) of the belt dryer (1).

14. Method according to claim 13, wherein the compactor (5) is provided in the transition area between two conveyor belts (3, 4) of the belt dryer (1) succeeding one another in the conveying direction.

15. Method according to claim 14, wherein drying takes place on a single conveyor belt (14) of the belt dryer, in that the material is received by the compactor (5') from the conveyor belt (14) and is returned thereto after the compacting.

16. Method according to claim 15, wherein for adapting the method to the nature of the material to be dried the compactor (5) is adjustable in the direction of the conveyor belt (14).

17. Method according to claim 1, wherein the further drying and drying prior to the compacting takes place in a belt dryer through which a gaseous medium flows.

* * * * *